May 17, 1966 R. E. YOUNG 3,252,138

SELF-CHECKING DIGITAL TELEMETERING SYSTEM

Filed Dec. 20, 1960 6 Sheets-Sheet 1

INVENTOR
Robert E. Young

Irons, Birch, Swindler & McKie
ATTORNEYS

SELF-CHECKING DIGITAL TELEMETERING SYSTEM

Filed Dec. 20, 1960 6 Sheets-Sheet 2

May 17, 1966 R. E. YOUNG 3,252,138

SELF-CHECKING DIGITAL TELEMETERING SYSTEM

Filed Dec. 20, 1960 6 Sheets-Sheet 3

May 17, 1966 R. E. YOUNG 3,252,138

SELF-CHECKING DIGITAL TELEMETERING SYSTEM

Filed Dec. 20, 1960 6 Sheets-Sheet 4

STATION ADDRESS ENCODE-DECODE

May 17, 1966 R. E. YOUNG 3,252,138

SELF-CHECKING DIGITAL TELEMETERING SYSTEM

Filed Dec. 20, 1960 6 Sheets-Sheet 5

May 17, 1966 R. E. YOUNG 3,252,138

SELF-CHECKING DIGITAL TELEMETERING SYSTEM

Filed Dec. 20, 1960 6 Sheets-Sheet 6

United States Patent Office 3,252,138
Patented May 17, 1966

3,252,138
SELF-CHECKING DIGITAL TELEMETERING SYSTEM

Robert E. Young, Houston, Tex., assignor to Dresser Industries, Inc., Dallas, Tex., a corporation of Delaware
Filed Dec. 20, 1960, Ser. No. 77,118
5 Claims. (Cl. 340—146.1)

This invention relates to a digital telemetering system and, more particularly, to apparatus in such a system for checking the accuracy of responses from the slave stations to messages from the master station of such a system.

In digital telemetering systems, and especially in such systems designed for gas and oil pipelines, it has become conventional both to control and to monitor the everal pumping stations along the line from a master station. In order that this may be accomplished, each slave station is given a particular digital address so that it may distinguish between messages directed to it from the master station over a common communications channel from messages directed to others of the slave stations. In order that the master station may identify which slave station responds to its message, the message from the slave station begin with its own address.

It is also conventional to provide for cyclic interrogation of the slave stations, requesting them to transmit the readings of various transducers back to the master station, in order that such readings may be indicated or recorded for the purpose of checking on the proper operation of the slave stations and for accounting purposes. Since there are normally a plurality of transducers at each slave station, the master station interrogation consists of both a slave station address and the address of the particular transducer whose reading is requested at that time, the data address. After such interrogation, the master station remains silent for a time interval during which the slave station transmits its own station address, followed by the data address, and finally followed by the requested data, the reading of the selected transducer. This message is of course received at the master station and appropriately acted upon, as by indication or recording. Then, the master station transmits a message requesting the same or different data from a different slave station, or different data from the same station, proceeding with the pre-set interrogation cycle.

In certain pipeline telemetering systems, provision is made for controlling the slave stations from the master station, as by instructing the station to change pump speed, to change the number of pumps or compressors in operation, etc. This may be effected through translation of operator commands at the master station into digital messages to the desired slave station. Again, however, the address of the slave station must be associated with the command, as must also be the address of the particular command function. In order that the operator may know whether his command has been received by the selected slave station, the slave station may transmit a message back to the master station including its address, together with the address of the particular function selected. Later, when the command has been carried out, the slave station may transmit a message including that fact, together with its address and the function address, to the master station.

Many other functions can be and have been designed into such telemetering systems, the above-identified functions and operations being merely illustrative for the purpose of furnishing a background for this invention. In connection with each of these functions, it is important that the operator know that the proper slave station has recignized its message and the proper transducer has transmitted its reading, or that the proper command has been carried out, etc. To furnish this assurance, it has been suggested that the address portion of the master station message be compared with the corresponding portion of the slave station message, and that appropriate steps, such as malfunction indication, be taken if the two address portions disagree. Such previous suggestions have involved storage of the address portion of the master station message and comparison of the stored address with the corresponding portion of the slave message. Such storage, however, increases the complexity and cost of the apparatus, and it is one of the purposes of this invention to eliminate the storage.

In the present invention, the station and/or data addresses are sequentially encoded at the master station and are then transmitted to the slave stations. Then the master station awaits response from the selected slave station before encoding the next address(es). The previously-transmitted address(es) are therefore available at the master station encoder, and this invention provides for gating such encoded address to a comparator simultaneously with receipt of the corresponding address from the slave station. When the two addresses disagree, an "error" response is developed, while a "correct" response may also be generated if they agree. Appropriate action may be taken upon an "error" response, and this invention further contemplates re-transmission of the previously transmitted message in response thereto. At any rate, it will be apparent that by comparison of the previously encoded address with the currently-received address, the necessity of storing the master station-developed address has been eliminated.

Re-transmission of the message is of course designed to detect the transient nature of conditions that may have caused the previous "error" response. For instance, a momentary electrical disturbance may result in no message or an erroneous message being sent to the master station. This disturbance may, however, disappear momentarily such that, if a message were immediately retransmitted to the slave station, it would respond correctly thereto and transmit a correct message to the master station. Therefore, to compensate for such possibility, the master station encoder is preferably controlled by counter means which are automatically cyclically advanced but which are inhibited from advancement as long as an "error" response is obtained. Thereby, continued re-transmission would occur but for an error counter which counts the error responses, and, when a predetermined number occur, energizes an error counter bypass circuit to reset the counter and remove the inhibition to cycling of the encoder counter. However, the bypass circuit preferably remains effective to prevent error counting and re-transmission until a "correct" response is obtained from the comparator.

A feature of the invention which is of particular significance is that the encoded address is in parallel-by-bit, serial-by-digit form, so that comparison can be made with a minimum of circuitry, certainly with considerably less than if the compared bits were serial in form.

The invention will now be more fully described in conjunction with a preferred embodiment shown in the accompanying drawings.

Figure 1:
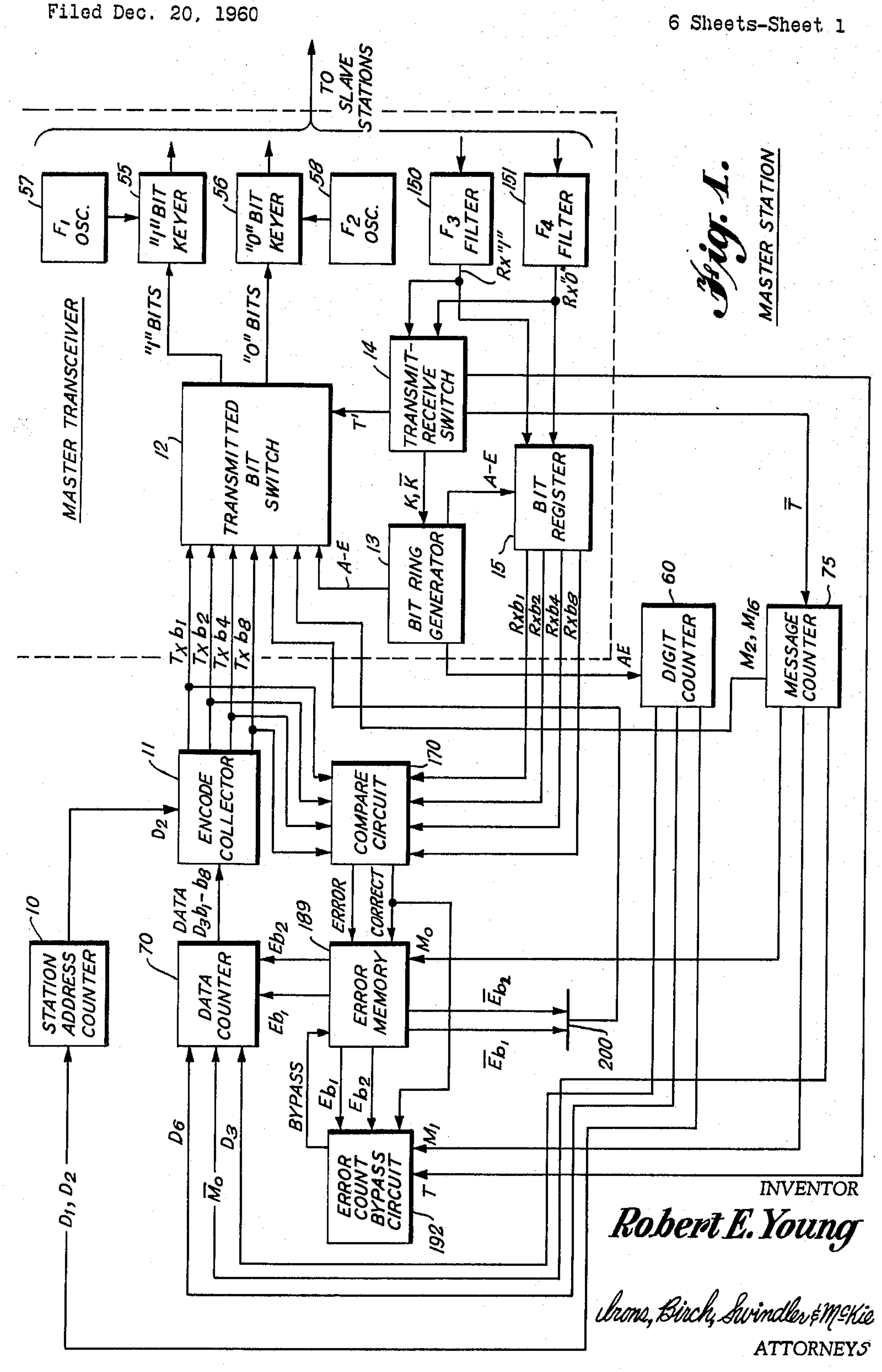
FIG. 1 is a block diagram showing the main elements of the master station including the master transceiver.
Figure 2:
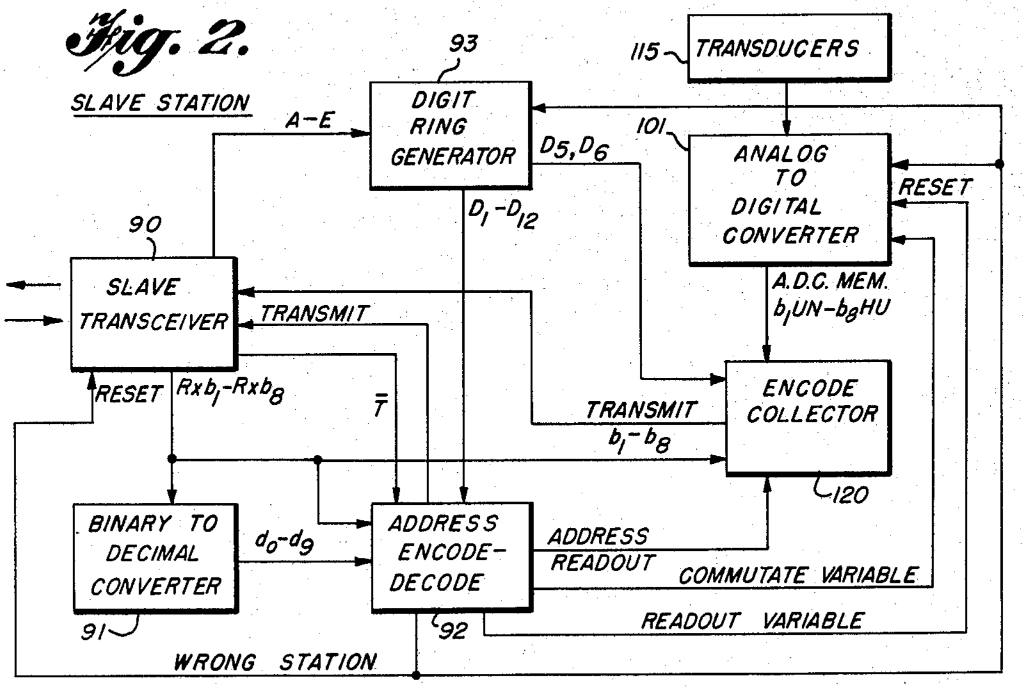
FIG. 2 is a block diagram showing the main elements of a slave station.

Referring first to FIGS. 1 and 2, there are shown therein block diagrams of the master station and one of the slave stations, respectively, of the telemetering system. The system is extremely similar to, and is indeed an improvement over, the telemetering apparatus disclosed in an application of Lawrence W. Langley, S.N. 848,088, filed Oct. 22, 1959, now U.S. Patent 3,045,210, issued July 17, 1962, and assigned to the same assignee as the present invention. The system operates on a binary-coded-decimal code, with a single communication medium such as a wire line extending between the master station and each one of the slave stations. Messages from the master station are encoded with "0" and "1" bits of different frequencies, and messages from the slave stations are encoded with "0" and "1" bits of still different frequencies. The system is preferably arranged so that each message from the master station is preceded by a so-called fifth frequency pulse which resets the various circuits at the several slave stations.

Figure 3:
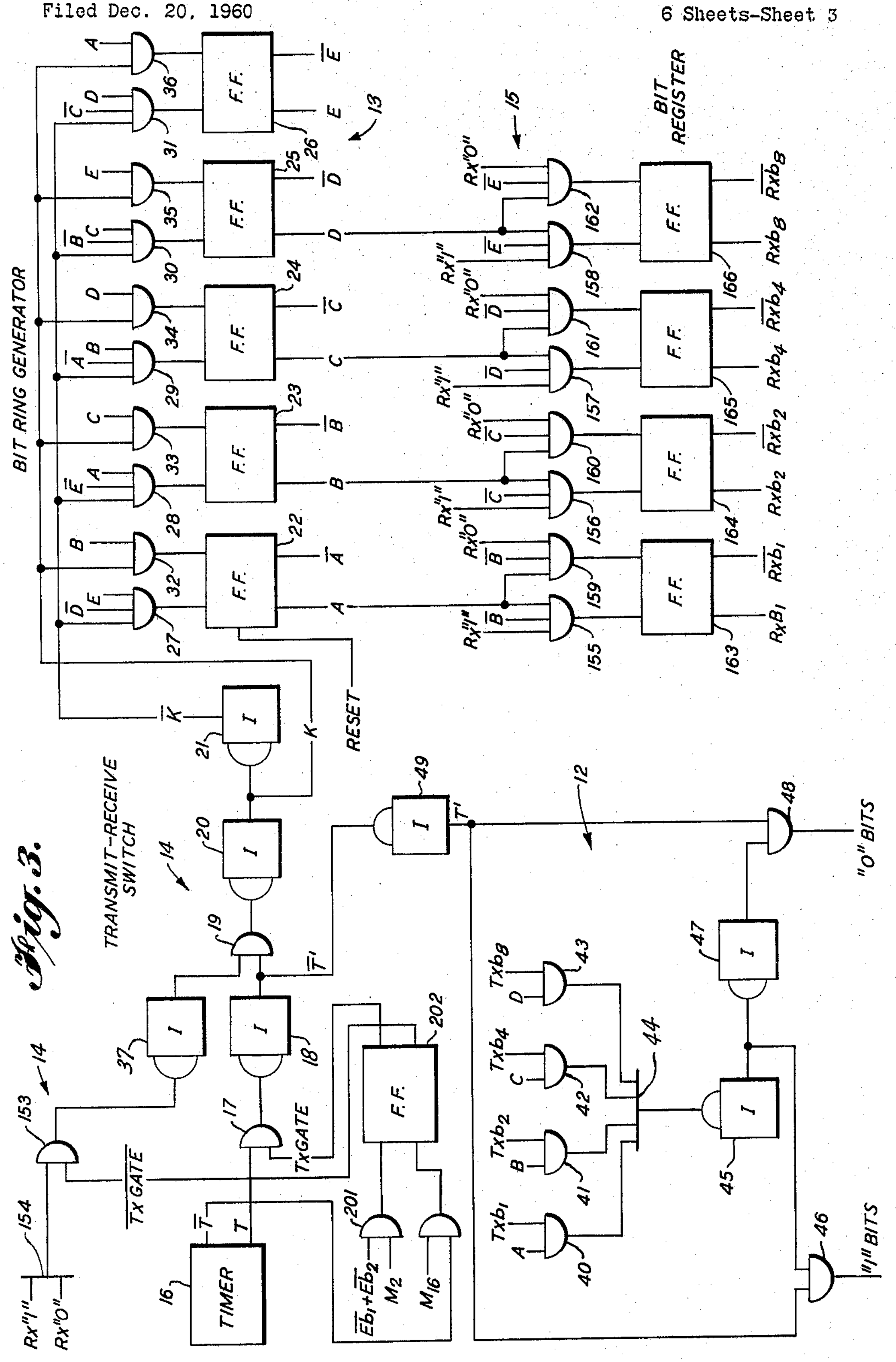
FIG. 3 is a logic diagram showing the transceiver of the master station in greater detail.

Referring now to FIG. 1, the system is preferably designed to proceed in a cyclic interrogation fashion, with the master station sequentially requesting different data from the slave stations. In the illustrated embodiment, only a single slave station is provided for, but it will be obvious that the apparatus could be expanded upon to provide for a plurality of slave stations. For this purpose, the master station is provided with a station address counter 10 which supplies gate pulses (or a single gate pulse in the present case) to an encode collector 11. The encode collector supplies gate pulses which control the transmitted bit switch 12 which in turn translates the parallel-by-bit gate pulses from the encode collector into serial-by-bit transmissions from the master station. This translation function is achieved, as in the Langley apparatus, through operation of a bit ring generator 13 which is controlled by a transmit-receive switch 14. Referring now to FIG. 3, the transmitted bit switch 12, the bit ring generator 13, and the transmit-receive switch 14 are shown therein in more detail, together with the bit register 15. The transmit-receive switch 14 includes a timer 16 which supplies a cyclic voltage which may be of, for instance, 50 cycles per second. The output of the square wave timer consists of a pulse T for 10 milliseconds, followed by a pulse $\overline{T}$ for the other 10 milliseconds, of each cycle of the timer output. The T output of the timer is supplied with a transmit gate pulse to a logical AND circuit 17. Suffice it to say at this point that the transmit gate circuit is on at the beginning of each cycle of operations. The manner in which this transmit gate circuit is turned on and off will be described hereinafter. The output of the logical AND circuit 17 is supplied through an inverter 18 to one input of a logical AND circuit 19. The other input of AND circuit 19 is controlled by the received bits of the master transceiver, and, at this time, because of the operation of inverter 37, there is a gate pulse input to logical AND circuit 19 at both sides, thereby supplying a pulse output. The output of AND circuit 19 is inverted in inverter 20 to supply a gate pulse identified by the letter K, and is also inverted again in inverter 21 to supply the inversion, the gate pulse $\overline{K}$.

Figure 4:
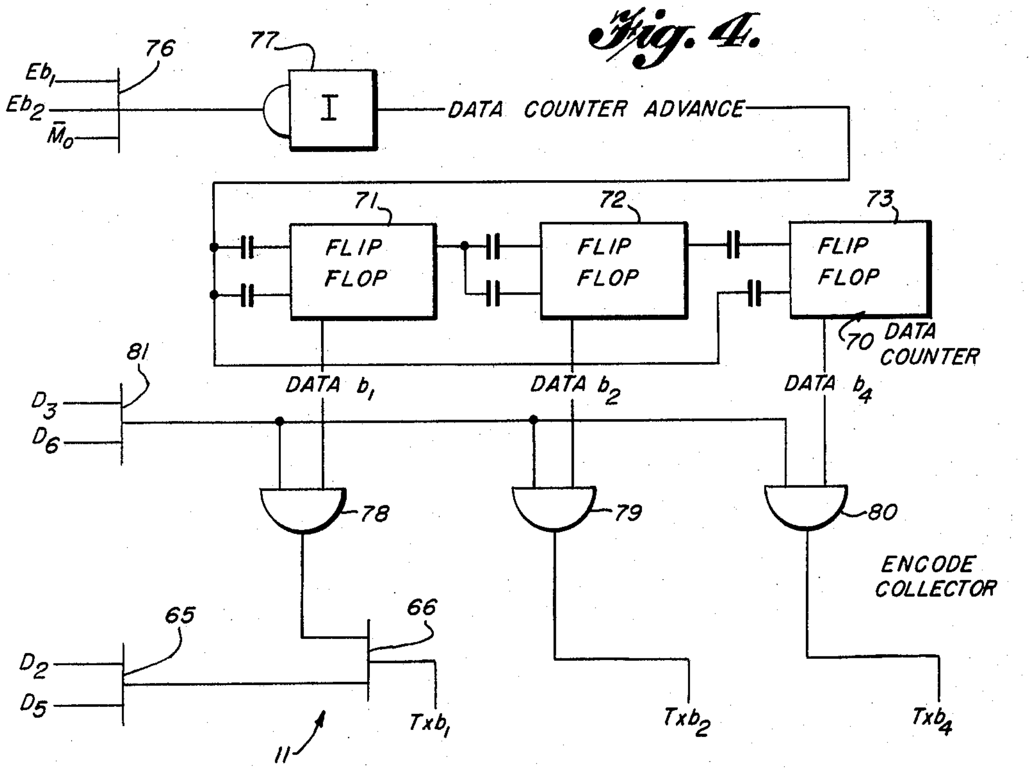
FIG. 4 is a logic diagram showing the data count and encode collector of the master station in greater detail.

The gate pulses K and $\overline{K}$ are 10 millisecond gate pulses repeated at a frequency of 50 cycles per second, in the illustrative embodiment. These gate pulses are employed to control the bit ring generator 13 which includes five bistable flip-flops 22–26. In this specification, I use the terms "flip-flop" or "latch" to indicate a bistable flip-flop. The flip-flops provide the gate pulses A–E or their inversions, $\overline{A}$ through $\overline{E}$, these corresponding to the "1" and "0" outputs of the flip-flops, respectively. The "1" inputs of the flip-flops 22 through 26 are controlled by logical AND circuits 27–31, respectively, and the "0" inputs of the flip-flops are controlled by the logical AND circuits 32–36, respectively. These AND circuits are themselves controlled by the K and $\overline{K}$ gate pulses which originate in the timer 16 during transmit time, combined with the outputs of the flip-flops in such fashion as to cause the gate pulses A–E to turn on sequentially. A timing diagram showing the sequence of these gates is illustrated in FIG. 4 of the Langley patent above referred to.

The gate pulses A–D are supplied to logical AND circuits 40–43, respectively, of the transmitted bit switch 12. Each one of these AND circuits is supplied with a gate pulse from the encode collector 11, the AND circuit 40 being supplied with the transmit bit "1" gate pulse, the AND circuit 41 with the transmit bit "2" gate pulse, the AND circuit 42 with the transmit bit "4" gate pulse, and the AND circuit 43 with the transmit bit "8" gate pulse.

The outputs of the AND circuits 40–43 are connected to the inputs of a logical OR circuit 44, so that, whenever any one of the AND circuits furnishes an output, an output is in turn obtained from the OR circuit 44. This output is inverted in inverter 45 and supplied to one input of a logical AND circuit 46. The output of inverter 45 is further inverted in inverter 47 and supplied to one input of a logical AND circuit 48. The other inputs of AND circuits 46 and 48 are supplied from the timer 16 by connection of the output of inverter 18 of the transmit-receive switch through a further inverter 49 to the inputs of the two AND circuits. The gate pulse obtained from inverter 49 is a transmit gate pulse coinciding with the "T" pulse output of timer 16, identified in the drawing with the legend "T′."

As a result of these connections, whenever the transmit bit "1" gate pulse is obtained from encode collector 11, at "A" time, and when the gate pulse "T′" is up, a "1" bit gate pulse is supplied to the "1" bit keyer 55 of FIG. 1. If the transmit bit "1" gate is not up at this time, the AND circuit 48 will supply a "0" bit gate pulse to the "0" keyer 56 of FIG. 1. Therefore, at "A" time when the "T′" gate pulse is on, there will either be transmitted a "1" or a "0." The keyers 55 and 56 are supplied with different frequency voltages from oscillators 57 and 58, and are operable to gate these voltages into the transmission medium whenever the keyers are supplied with enabling pulses.

The transmitted bit switch works in similar manner during the "B–D" gate pulses, causing transmission of a "1" or a "0" depending upon whether the transmit bit "2," transmit bit "4," and transmit bit "8" gate pulses are on. The fifth bit gate pulse, "E," is customarily employed to develop a so-called redundancy or "R" bit which may, for instance, be designed to insure that the five bits in each digit have an odd number of "1" bits. This is arranged so that redundancy checking can be carried out at the receiving station and any message which contains an even number of "1" bits can be rejected. Since this is a conventional feature which is described in the Langley patent referred to above, it will not be referred to more fully herein.

Referring again to FIG. 1, it was indicated above that the apparatus specifically illustrated herein includes only a single slave station, though it could be readily expanded to include a plurality of such stations. Hence the system is designed to provide for the address of the slave station being transmitted from the master station during the first two digits of each message from the master station. Therefore, the station address counter 10 is shown as supplied with gate pulses "$D_1$" and "$D_2$" from a digit counter 60. This digit counter is of the same general type as the bit ring generator 13 but is driven by the gate pulses obtained from the bit ring generator to supply gate pulses $D_1$ through, for instance, $D_{12}$, which come up successively and each of which includes five bit spaces. The digit ring counter will not be fully described herein, since it is disclosed in the Langley patent referred to above.

In the specific embodiment disclosed herein, since there is only one slave station, it is not necessary to use both the digits $D_1$ and $D_2$ for identification of the slave station. Therefore, only "0's" are transmitted during the first digit time, and a "1" need be transmitted only in the "1" bit position during the second digit time, to identify the slave station.

Referring now to FIG. 4, the encode collector 11 is there shown as being supplied with the digit $D_2$ which is obtained from the station address counter 10 and which is connected to a logical OR circuit 65. This OR circuit is in turn connected to a second logical OR circuit 66 so that, whenever the digit gate pulse $D_2$ comes up, there is a transmit bit "1" gate pulse available from the encode collector. During the second digit time this of course is translated into a "1" bit during the first bit time.

The encode collector 11 is also supplied with gate pulses from a data counter 70 (FIG. 1) which is shown in more detail in FIG. 4 as including three flip-flops 71–73 arranged in counting fashion. This counter is designed to be advanced automatically at the beginning of each cycle of operations to sequentially supply data bit "1," data bit "2," and data bit "4" gate pulses for control of the encode collector 11. These gate pulses are provided one for each cycle of the operations of the telemetering system. They are designed to interrogate the slave station to cause it to respond with the readings of its several transducers successively in successive cycles of operation of the system. The data counter advance gate pulse for control of the data counter 70 is obtained from a message counter 75 (FIG. 1) which supplies a plurality of non-coincident 20 milliseconds gate pulses (in the illustrated example) for control of the sequence of operation of the apparatus. The message counter is a simple ring counter together with logical circuitry such as to obtain from the "$\overline{T}$" pulse from the transmit-receive switch 14, the message gate pulses which operate the system. The "$M_0$" gate pulse is the first message gate pulse generated during each cycle, and the system is designed to allow generation of 75 gate pulses, ending with gate pulse $M_{74}$, for each cycle of the apparatus. The gate pulse $\overline{M}_0$, indicating that the gate pulse $M_0$ is not on, is supplied to a logical OR circuit 76 and the output of the OR circuit is inverted by inverter 77, so that, at $M_0$ time, a data counter advance gate pulse is normally generated to cause advance of the data counter 70. Provision is made for inhibition of such advance to be described hereinafter.

The flip-flops 71–73 of the data counter supply their "1" outputs to logical AND circuits 78–80, respectively. The other inputs to these AND circuits are obtained from a logical OR circuit 81 which is supplied with digit gate pulse $D_3$ from digit counter 60. Thereby, the appropriate gate pulse "Data bit 1," "Data bit 2" or "Data bit 4" is supplied to the encode collector and emerges as gate pulse "Transmit bit 1," "Transmit bit 2" or "Transmit bit 4" at $D_3$ time. As an illustration, the suction pressure transducer at the slave station might be caused to be read by transmission of a decimal "1" during $D_3$ time. With redundancy bits supplied, the message transmitted from the master station would then be 0–0–0–0–1, 1–0–0–0–0, 1–0–0–0–0.

The address messages from the master station are received at the slave station and are there translated into parallel-by-bit serial by digit gate pulses $Rxb_1$–$Rxb_8$ by the transceiver 90. The slave transceiver is similar to the master station transceiver in that it includes a transmitted bit switch, a transmit-receive switch, a bit ring generator, a bit register, a pair of bit keyers, a pair of different frequency oscillators for "0" and "1" transmitted bits, and filters for separating the received "0" and "1" bits. The slave transceiver, moreover, is fully described in the Langley patent above referred to, so that it will not be more fully described herein. It does, however, transmit on different frequencies than it receives, so that the received and transmitted bits may be kept separate in the system.

The received and translated "0" and "1" bits (translated from serial-by-bit to parallel-by-bit form) are supplied by the transceiver to a binary-to-decimal converter 91 which translates them into decimal gate pulses representing the various decimal numbers to which the coded bits correspond. Both these decimal gate pulses $d_0$ to $d_9$ and the bit register output of the receiver ($Rxb_1$–$Rxb_8$) are supplied to the address encode-decode circuit 92, which also receives the timing gate pulse $\overline{T}$ from transceiver 90 and digit gate pulses $D_1$–$D_{12}$ from the digit ring 93. As in the master station equipment, the digit ring is cycled by the bit gate pulses A–E from the transceiver and supplies one digit gate pulse for every five bit gate pulses A–E.

Figure 5:
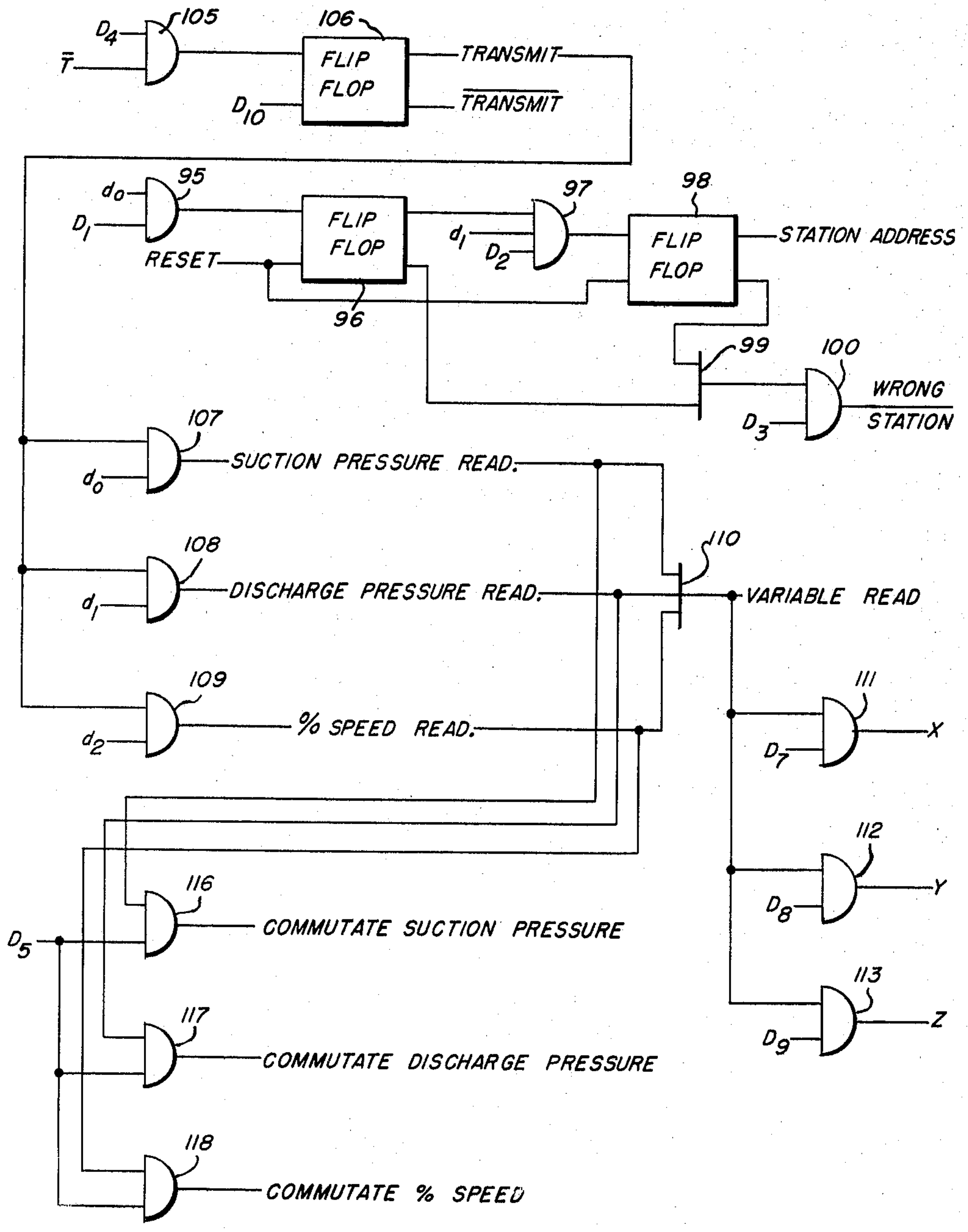
FIG. 5 is a logic diagram disclosing the station address encode-decode of the master station.

The address encode-decode is shown more fully in FIG. 5. The decimal "0" ($d_0$) gate pulse is there combined with the $D_1$ gate pulse in a logical AND circuit 95 which is connected to the "1" input of a flip-flop 96. The decimal "1" gate pulse ($d_1$) is also combined with the $D_2$ gate pulse in a logical AND circuit 97 to which is also supplied the output of flip-flop 96, and the output of AND circuit 97 is supplied to the "1" input of a flip-flop 98. Since the address of the slave station is "01," the two flip-flops 96 and 98 must be in their "1" conditions for the station to be properly addressed. The "0" outputs of these flip-flops are supplied to a logical OR circuit 99 whose output is supplied, with digit gate pulse $D_3$, to the input of logical AND circuit 100. The output of this AND circuit is a "wrong station gate pulse" which provides a reset for the transceiver 90, the digit ring 93 and an analog to digital converter 101 (FIG. 2) to reset these components to their initial conditions whenever an improper station address is received by the slave station.

Of course, in the illustrated embodiment, only a single slave station is shown, so that every message properly received by the slave station will have as its first two digits the binary equivalent of "01" but, as indicated earlier, the system is designed for expansion to include other slave stations which would of course have different addresses. In such case, the wrong station gate pulse would provide the necessary reset for the slave station(s) which was not addressed by the master station and therefore should not respond thereto. Even with only the single slave station, the wrong station gate pulse provides a useful purpose, since the communication line, or some fault in the master or slave station equipment, could cause gate pulses other than decimal 0 and 1 to be developed at $D_1$ and $D_2$ times, respectively. Since the generation of the "wrong station" gate pulse in such instance would reset the slave station equipment, no message would be sent back to the master station and this fact could readily be indicated by a suitable indicator alerting the operator to the fault, so that appropriate repair procedure could be implemented.

At $D_4$ time all of the digits transmitted by the master station will have been received at the slave, and the slave will be ready to respond, assuming it has not been reset by the wrong station gate pulse. The combination of gate pulse $D_4$ and timing pulse $\overline{T}$ is supplied to a logical AND circuit 105 which supplies its output to the "1" input of a transmit flip-flop or latch 106. That flip-flop supplies a transmit gate pulse which is directed to the transceiver 90 to appropriately control the transceiver during transmission. (The $D_{10}$ gate pulse resets the tranmit flip-flop to 0 to eliminate the possibility of a transmit gate pulse being developed while a message is being received from the master station.)

The transmit gate pulse is also supplied to a plurality of logical AND circuits 107–109. These AND circuits also respectively receive decimal gate pulses $d_0$–$d_2$ from the binary-to-decimal converter 91. At this time in the cycle the decimal gate pulses will correspond to the third of the received digits, which in the illustrative example was 1. The logical AND circuit 108 will therefore supply an output indicating that the master station desires the reading of the discharge pressure transducer.

This gate pulse, together with the now-down gate pulses from AND circuits 107 and 109, is supplied to a logical OR circuit 110 whose output is supplied to each of a trio of logical AND circuits 111–113. These AND circuits also receive digit gate pulses $D_7$–$D_9$, respectively, and supply gate pulses X, Y and Z when their two inputs coincide.

Figure 6:
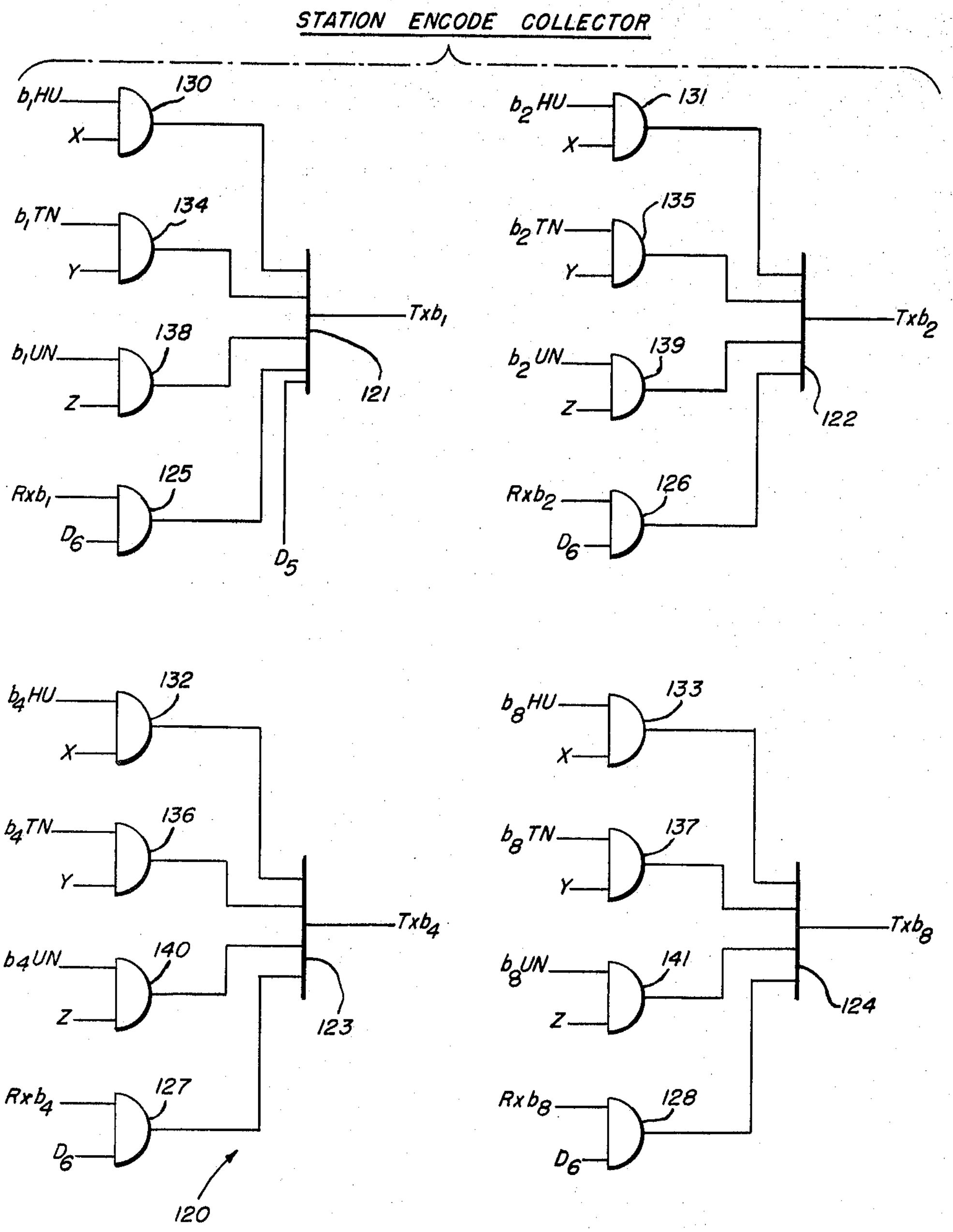
FIG. 6 is a logic diagram showing the slave station encode collector.

The outputs of AND circuits 107–109 are also supplied to the analog to digital converter 101 as readout variable gate pulses to cause that converter to select the desired one of the transducers 115. In addition, these same outputs are respectively supplied to logical AND circuits 116–118 which are also supplied with digit gate pulse $D_5$. The analog to digital converter is also supplied with the outputs of these AND circuits to prepare the converter for commutation of the output of the selected transducer. Conversion of this output into binary-coded-decimal form takes place during $D_6$–$D_8$ time, one digit ahead of transmission of the corresponding code. In the meantime, the slave station must transmit its own and the requested function address during $D_4$–$D_6$ time. This operation is controlled by the encode collector 120, shown in detail in FIG. 6. The encode collector includes a set of logical OR circuits 121–124 which supply the transmit bit 1–bit 8 gate pulses ($Txb_1$–$Txb_8$) to the transceiver 90. The address encode-decode 92 supplies the encode collector 120 with address readout gate pulses. In the illustrated embodiment the first digit of the address of the slave station is "0," and, since the transceiver will transmit a zero except when supplied with transmit bit gate pulses (see the operation of the transmitted bit switch of FIG. 3), it is unnecessary to supply the encode collector with a gate pulse during $D_4$ time. However, the logical OR circuit 121 is supplied with the $D_5$ gate pulse from the address encode-decode, so that the $Txb_1$ gate pulse is up during $D_5$ time. The other OR circuits 122–124 are not, however, supplied with gate pulses during this time, so that the transceiver transmits bits 1–0–0–0–0 during $D_5$.

The OR circuit 121 is also supplied with the output of a logical AND circuit 125 whose inputs are digit gate pulse $D_6$ and bit register bit "1" ($Rxb_1$) from the transceiver 90. Similar AND circuits 126–128 receive $D_6$ and gate pulses $Rxb_2$–$Rxb_8$, respectively. These latter AND circuits are each connected to an input of OR circuits 122–124, respectively. Thereby the last-received digit determines the digit transmitted during $D_6$ time. In the illustrative example, this was 1–0–0–0–0, so OR circuit 121 would supply $Txb_1$ gate pulse at this time while the other gate pulses would be down.

The analog-to-digital converter 101 was fully described in the Langley patent and need not be further referred to. Suffice it to say at this time that the converter supplies bit 1 through bit 8 gate pulses during hundreds, tens, and units times, respectively. That is, during $D_7$ time the encoded hundreds value of the transducer reading is available as gate pulses $b_1$HU, $b_2$HU, $b_4$HU and $b_8$HU at the input of encode collector 120, while at $D_8$ time the tens value is available as gate pulses $b_1$TN, $b_2$TN, $b_4$TN and $b_8$TN, and at $D_9$ time the units value is available as gate pulses $b_1$UN, $b_2$UN, $b_4$UN and $b_8$UN. These various gate pulses are supplied to logical AND circuits in the encode collector, the hundreds gate pulses being supplied to AND circuits 130–133, the tens gate pulses to AND circuits 134–137, and the units gate pulses to AND circuits 138–141. These sets of AND circuits are also respectively supplied with the X, Y and Z gate pulses from station address encode-decode 92, X representing variable read at $D_7$ time, Y variable read at $D_8$ time and Z variable read at $D_9$ time. The outputs of AND circuits 130, 134 and 138 are supplied to OR circuit 121, the outputs of AND circuits 131, 135 and 139 to OR circuit 122, the outputs of AND circuits 132, 136 and 140 to OR circuit 123, and the outputs of AND circuits 133, 137 and 141 to OR circuit 124. Thereby, the appropriate transmit gate pulses $Txb_1$–$Txb_8$ are developed during these times, in parallel-by-bit form, and supplied to transceiver 90 where they are translated into serial-by-bit form and transmitted to the master station.

At the master station (FIG. 1) the received "0" and "1" bits are separated by filters 150 and 151, respectively, and directed to transmit-receive switch 14. In the transmit-receive switch (FIG. 3) the received "1" and "0" bits are supplied through a logical OR circuit 154 to a logical AND circuit 153 which is also supplied with the inversion of the transmit gate pulse. The output of AND circuit 153 is supplied through inverter 37 to AND circuit 19. With these connections and the inverter 20 in the AND circuit 19 output, as well as the connections from timer 16, gate pulses K and $\overline{K}$, which drive bit ring generator 13, are available either from the received bits or the timer.

The received bits are also supplied to bit register 15, the received "1" bits going to inputs of logical AND circuits 155–158 and the received "0's" to logical AND circuits 159–162. There they are combined with the outputs of bit ring generator 13 to translate the serial-by-bit, parallel-by-digit message into parallel-by-bit form in flip-flops or latches 163–166.

The register gate pulses $Rxb_1$–$Rxb_8$ are supplied to a comparator or compare circuit 170 (FIG. 1) which is designed to compare the transmitted and received addresses for agreement or disagreement therebetween. Referring back to FIG. 4, the $Txb_1$ gate pulse is also supplied to the compare circuit at $D_5$ time, through connection of the $D_5$ digit gate pulse to OR circuit 65. At $D_6$ time, the selected one(s) of the data gate pulses are supplied to the compare circuit through connection of the $D_6$ gate pulse to OR circuit 81. Thus, the outputs of the address counter and the data counter are supplied to the compare circuit at the corresponding received digit times, though they are not again transmitted, since the transmit gate pulse is not up at this time.

Figure 7:
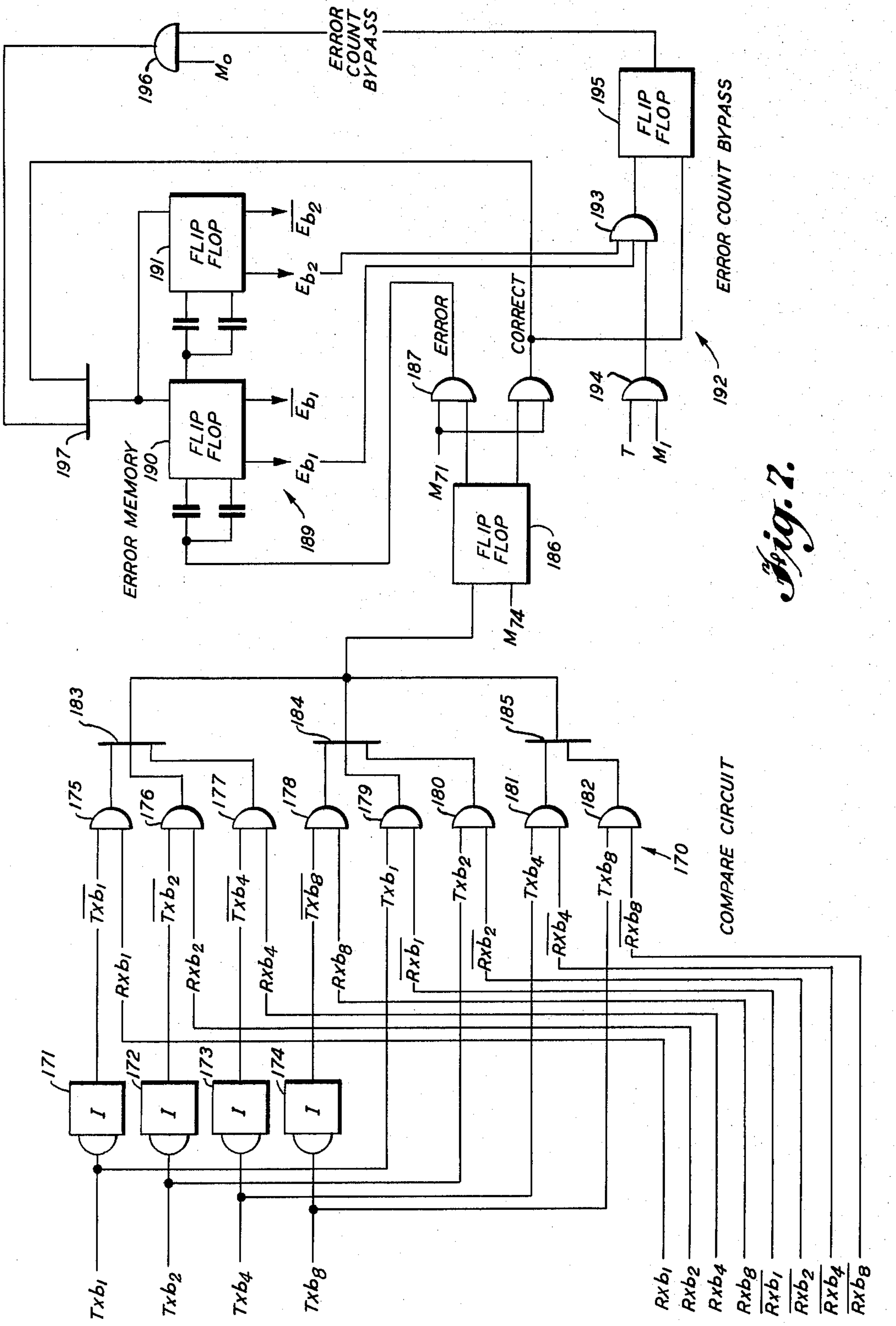
FIG. 7 is a logic diagram showing the compare circuit, the error memory, and the error count by-pass circuit of the slave station.

The compare circuit 170 is shown in more detail in FIG. 7. The various ones of the bit register gate pulses $Rxb_1$–$Rxb_8$ and their complements $\overline{Rxb_1\text{–}Rxb_8}$ are there combined with the encode transmit gate pulses $Txb_1$–$Txb_8$, and their complements. The latter are obtained from inverters 171–174, supplied with gate pulses $Txb_1$–$Txb_8$. The receive register gate pulses and their inverted corresponding encode transmit gate pulses are combined in logical AND circuits 175–182, gate pulses $\overline{Txb_1}$ and $Rxb_1$ being supplied to AND circuit 175, etc. The outputs of the AND circuits are supplied to OR circuits 183–185 whose outputs in turn are supplied to the "1" input of flip-flop or error latch 186. Since the two inputs to each of the AND circuits 175–182 will only co-exist when the corresponding parts of the transmitted and received addresses disagree, the flip-flop will only be turned to its "1" condition when there is an error.

The "1" output of flip-flop 186 is supplied, with message gate pulse 71 ($M_{71}$) to logical AND circuit 187, while the "0" output, with the same gate pulse, is supplied to logical AND circuit 188. Therefore, whenever there is a disagreement between the addresses of the transmitted and the received messages, at $M_{71}$ time (near the end of a message cycle), there will be an "error" gate pulse from AND circuit 187, while, if the addresses agree, there will be a "correct" gate pulse at the output of AND circuit 188.

The "error" gate pulse is supplied to a three-count counter or error memory 189 including flip-flops 190 and 191. The memory is normally in such condition that the "0" outputs ($\overline{Eb_1}$ and $\overline{Eb_2}$) of flip-flops 190 and 191 are both up, but the first error gate pulse advances the counter to $Eb_1$, $\overline{Eb_2}$. The next error gate pulse causes the $Eb_1$ gate pulse to fall and the $Eb_2$ gate pulse to come up, and the third error gate pulse results in $Eb_1$, $Eb_2$. These last two gate pulses are supplied to error count by-pass circuit 192 where they are combined in AND circuit 193 with the output of another AND circuit 194 which is supplied with timing gate pulse T and message gate pulse $M_1$. Thereby, when three errors have been counted, at the beginning of the next message cycle, the AND circuit 193 supplies a gate pulse to turn the error count by-pass flip-flop 195 to its "1" condition. The resultant error count by-pass gate pulse is combined with message gate pulse $M_0$ in AND circuit 196, whose output is supplied to OR circuit 197. The other OR circuit input is the "correct" gate pulse from AND circuit 188, and the OR circuit output is supplied to the reset inputs of the error memory flip-flops 190 and 191. Therefore, when either of the "error count by-pass" or the "correct" gate pulse is up, the memory is reset to $\overline{Eb_1}$, $\overline{Eb_2}$ condition. Of course, the "correct" gate pulse only resets the error memory once, but the "error count by-pass" gate pulse causes the memory to be reset to its "0" condition each time message gate pulse $M_0$ comes up, that is, the beginning of each message cycle.

As indicated in FIG. 1, the error count gate pulses $Eb_1$ and $Eb_2$ are supplied to data counter 70. As shown more particularly in FIG. 4, these gate pulses are both supplied to OR circuit 76, along with the inversion of message gate pulse $M_0$. The combination of OR circuit 76 with inverter 77 of course forms a logical NOR circuit, so that the data counter advance gate pulse is developed only if neither $Eb_1$ nor $Eb_2$ is present. These gate pulses, therefore, inhibit the normal automatic advance of the data counter.

The error memory also controls the generation of the transmit gate pulse. Referring to FIGS. 1 and 3, the gate pulses $\overline{Eb_1}$ and $\overline{Eb_2}$ are both supplied to a logical OR circuit 200 whose output is supplied to the transmitted bit switch 12. In that circuit, the output of OR circuit 200 is supplied, with message gate pulse $M_2$, to logical AND circuit 201, whose output is in turn supplied to the "1" input of transmit flip-flop 202. The "1" output of that flip-flop is supplied to AND circuit 17, while the "0" output is supplied to AND circuit 153. Thus, as long as neither one of $Eb_1$ and $Eb_2$ (indicating an error count of other than 3) is up, the transmit gate pulse is always turned on at $M_2$ time. If the error count is 3, however, the transmit gate pulse does not come up at $M_2$ time, because it is desired, during the next message cycle, to check the transmission line. The apparatus for that purpose forms no part of the present invention and so is not described herein.

The transmit flip-flop 202 is reset to its "0" condition by gate pulse $M_{16}$ which is combined with timing gate pulse $\overline{T}$ in AND circuit 203, whose output is supplied to the "0" input of the flip-flop. $M_{16}$ of course comes up after the three digits of the master station message have been transmitted (5 bits per digit×3 digits), when the master station is ready for reception.

In operation of the apparatus of the illustrative embodiment, with particular emphasis on the checkback feature thereof, during $M_2$ time the transmit gate pulse comes up and causes the timer 16 (FIG. 3) to take over control of the bit ring generator 13. Since there are no transmitted bit gate pulses during $D_1$ time, the T′ pulses from the timer 16 (FIG. 3) cause the transmitted bit switch to develop "0" bit pulses during the first four bit times of the first digit. The redundancy circuit (not shown) causes a "1" bit to be encoded at "R-bit" time, so the first transmitted digit is 0–0–0–0–1. Then digit gate pulse $D_2$ comes up and (FIG. 4) supplies a $Txb_1$ gate pulse, so the second digit is 1–0–0–0–0. Next, digit gate pulse $D_3$ comes up causing the function address encoded by the data counter to be transmitted. Assuming that data $b_1$ is the only output from the data counter at this time, the third transmitted digit will be 1–0–0–0–0. Then, message gate pulse $M_{16}$ comes up, and the transmit gate pulse (FIG. 3) is turned off thus stopping supply of T′ gate pulses, so that the master transceiver stops sending bits.

As the transmitted bits are received at the slave station (FIG. 2), they are used to cycle the bit ring generator of the slave transceiver 90 to supply the necessary bit gate pulses A–E which in turn cycle the digit ring generator 93 to cause supply of the digit gate pulses. As each bit is received it is stored in the bit register (not shown, but identical with the master bit register 15, FIG. 3). The fifth or R-bit may be used to key the bit register output into the binary-to-decimal converter 91 where the first and second received digits are decoded as $d_0$ and $d_1$, respectively. Assuming these digits are received properly, the decimal equivalents will combine with digit gate pulses $D_1$ and $D_2$ in flip-flops 96 and 97 (FIG. 5) to insure that the "wrong station" gate pulse does not come up, but rather to provide a "station address" gate pulse which may be used to perform certain functions at the slave station that need not be discussed here.

The third digit may then be decoded and, at $D_4$ and $D_5$ times, the "readout variable" and "commutate variable" gate pulses, respectively, will be directed to the analog-to-digital converter 101 by the station address encode-decode 92. At $D_4$ time, also, the "transmit" gate pulse is developed by flip-flop 106 (FIG. 5). The slave station transmitted bit switch (not shown, but identical to switch 12 of FIG. 3) then will develop bit gate pulses to cause bits 0–0–0–0–1 to be transmitted during $D_4$ time.

At $D_5$ time the station encode collector 120 (FIG. 6) causes the $Txb_1$ gate pulse to come up and the transmitted bit switch causes the slave transceiver to transmit bits 1–0–0–0–0. At $D_6$ time, assuming the third digit transmitted by the master station was decimal 1, $Rxb_1$ gate pulse supplies $Txb_1$ gate pulse again, and the slave transceiver once more transmits bits 1–0–0–0–0.

At $D_7$–$D_9$ times, the encode collector and the transmitted bit switch cause the slave transceiver to transmit the binary-coded-decimal equivalent of the hundreds, tens and units values of the reading of the selected transducer. Then, at $D_{10}$ time the slave transmit gate pulse is turned off (FIG. 5) to prevent further transmission from the slave station.

As the message from the slave station is received at the master station, it is handled in exactly the same manner as the message from the master station is handled at the slave station, except for error checking. That is, the serial-by-bit, serial-by-digit data is translated into parallel-by-bit, serial-by-digit form in the bit register 15 (FIG. 3). The encoded gate pulses from encode collector 11 are then compared with the received bit gate pulses from the bit register in compare circuit 170. At $D_4$ time the "1," "2," "4" and "8" bits of the received message are all "0's," so the register gate pulses $\overline{Rxb_1}$, $\overline{Rxb_2}$, $\overline{Rxb_4}$ and $\overline{Rxb_8}$ are all up. Similarly, none of the transmit bit gate pulses from encode collector 11 are up, so the inverters 171–174 of the compare circuit (FIG. 7) supply gate pulses $\overline{Txb_1}$, $\overline{Txb_2}$, $\overline{Txb_4}$ and $\overline{Txb_8}$. There are therefore no outputs from AND circuits 175–182 and the flip-flop 186 remains in its "0" condition, supplying a "correct" gate pulse.

At $D_5$ time, the receive register supplies gate pulses $Rxb_1$, $\overline{Rxb_2}$, $\overline{Rxb_4}$ and $\overline{Rxb_8}$. The encode collector 11 and the inverters 171–174 similarly furnish gate pulses $Txb_1$, $\overline{Txb_2}$, $\overline{Txb_4}$ and $\overline{Txb_8}$, so once again no "error" gate pulse is developed. Let us assume, however, that for some reason, the receive register supplies gate pulses $\overline{Rxb_1}$, $Rxb_2$, $\overline{Rxb_4}$ and $\overline{Rxb_8}$ during $D_6$ time, this *not* being the proper data address. The encode collector and the inverters *will* supply gate pulses $Txb_1$, $\overline{Txb_2}$, $\overline{Txb_4}$ and $\overline{Txb_8}$ at this time. Therefore, outputs will be obtained from AND circuits 175 and 176, and flip-flop 186 will be changed to its "1" condition, developing an "error" gate pulse or response. This "error" gate pulse advances error memory 189 from its previous $\overline{Eb_1}$, $\overline{Eb_2}$ condition to $Eb_1$, $\overline{Eb_2}$. Referring to FIG. 4, it will be seen that the presence of "error" or inhibit gate pulse $Eb_1$ at OR circuit 76 will prevent the data counter advance gate pulse from coming up at $M_0$ time, so the data counter 70 will remain in the same condition and the next message transmitted from the master station will be identical with the one previously transmitted.

If the same, or a different error, is detected during receipt of the next message, the error memory 189 will advance to $\overline{Eb_1}$, $Eb_2$ condition and advance of the data counter will once more be inhibited. The master transceiver will again re-transmit the same message, and if an error is again detected, the error memory will advance to $Eb_1$, $Eb_2$ condition. Referring to FIG. 7, these gate pulses combine in AND circuit 193 at T and $M_1$ time to change the bypass flip-flop to its "1" condition, causing the "error count bypass" gate pulse to come up. Referring to FIG. 3, since neither $\overline{Eb_1}$, nor $\overline{Eb_2}$ is then available, the transmit gate pulse does not come up and one message cycle is available for such functions as the line check referred to hereinabove.

At the next $M_0$ time, both inputs to AND circuit 196 (FIG. 7) are up and the error memory is reset to $\overline{Eb_1}$, $\overline{Eb_2}$ condition. Consequently, at $M_0$ time data counter 70 is advanced to its next condition (Data $b_2$) and a message containing a new data address is sent out to the slave station during $D_1$–$D_3$ time. If the fault which caused the previous errors still exists, the "error" gate pulse will again come up, but the error memory will be reset at $M_0$ time by the "error count bypass" gate pulse, so the data counter will advance.

At any time that a correct message is received back from the slave station, flip-flop 186 (FIG. 7), which is reset to its "0" condition at the end of each message cycle, will not be reset to its "1" condition, and the resultant "correct" gate pulse will change flip-flop 195 to its "0" condition, turning off the "error count bypass" gate pulse and permitting the above sequence to take place if a subsequent malfunction occurs.

It will have been noted that message gate pulses $M_0$–$M_{74}$ and digit gate pulses $D_1$–$D_{12}$ are contemplated by the illustrated embodiment, despite the fact that only nine digits have been accounted for in the master and slave transmissions. The commercial embodiment of this invention from which the illustrated embodiment was adapted includes provision for additional functions, including control of "set-points" of slave station equipment from the master station. For this purpose, three additional digits may be transmitted from the master station, representing the hundreds, tens and units values of the selected "set-point." Therefore the system was designed to include timing for this and other functions. Since, however, these functions are not essential to the present invention, they are not illustrated in the drawings nor described in detail in this specification.

It will be evident that many minor changes could be made in the apparatus of the embodiment described in this application without departure from the scope of the invention. The invention is therefore not to be considered limited to the described embodiment, but rather only by the scope of the appended claims.

I claim:

1. In a digital telemetering system for transmitting function indications between a master and at least one slave station, which includes at the master station, means for sequentially and cyclically encoding a plurality of different addresses, means for transmitting each address to said slave station, there being a sufficient time interval between such address transmissions for the slave station to respond with the transmitted address, said sequential encoding means including a first counter which is normally advanced automatically at the end of each such time interval to cause encoding of the next address in the sequence, and which includes at the slave station, means responsive to receipt of an address for transmitting a message including such address to the master station, the improvement comprising: means for comparing the address received from the slave station with the address encoded at the master station, means responsive to agreement therebetween for producing a "correct" response and responsive to disagreement therebetween for producing an "error" response, a second counter operable in any condition but its zero condition to inhibit advance of said first counter at the end of such time interval, means for supplying said "error" response to said second counter to advance it by one count each time an "error" response is obtained, means responsive to said second counter reaching a pre-determined count for re-setting the counter and for preventing further advance of the counter by an "error" response by bypassing the counter and means responsive to a "correct" response for re-setting said second counter and eliminating such bypass.

2. In a digital telemetering system for transmitting function indications between a master and at least one slave station, which includes at the master station, timing means for sequentially developing a plurality of voltage gate pulses, means for cyclically encoding in parallel-by-bit form a plurality of different addresses including a first counter which is advanced at the time of every *n*th gate pulse to encode a different address of the cycle in the absence of an inhibit gate pulse, means operable by said *n*th gate pulses to transmit the currently-encoded address in serial-by-bit form to said slave station, there being a sufficient time interval between said *n*th gate pulses for the slave station to respond at least with the transmitted address, and which includes at the slave station, means responsive to receipt of an address for thereafter transmitting a message including at least such address to the master station in serial-by-bit form, and means which also includes at the master station means for translating the received message into parallel-by-bit form, the improvement comprising: means for comparing the currently-encoded address with the translated-received address during the interval between said *n*th gate pulses, means responsive to agreement therebetween for producing a "correct" response and responsive to disagreement therebetween for providing an "error" response, a second counter operable in any but its zero condition to provide an inhibit gate pulse to prevent advance of said first counter at the time of said *n*th gate pulses to cause re-transmission of the last encoded message during the next *n*th gate pulse, means for supplying said "error" response to said second counter to advance it by one count each time an "error" response is obtained, means responsive to said second counter reaching a predetermined count to provide a bypass gate pulse operable during each *n*th gate pulse to reset said second counter to zero if it is in any other condition so that re-tranmission cannot occur, and means responsive to a "correct" response for resetting said second counter and for controlling said last-named means to eliminate said bypass gate pulse.

3. In a digital telemetering system for transmitting function indications between a master and at least one slave station, which includes at the master station, means for sequentially and cyclically developing a plurality of timing voltage gate pulses, means operable during at least a first one of such timing gate pulses for developing an address voltage gate pulse, a data counter for cyclically developing a plurality of different data voltage gate pulses, said data counter being advanced at the beginning of each of such first gate pulses except when supplied with an inhibit gate pulse, an encode collector supplied with said address and data gate pulses and said timing gate pulses and operable to encode the address and data gate pulses in parallel-by-bit, serial-by-digit form with the encoded address gate pulse available during said first and a third one of such timing gate pulses and the encoded data gate pulse available during a second and a fourth one of such timing gate pulses, means operable during said first and second timing gate pulses to transmit said encoded address gate pulse and said encoded data gate pulse, respectively, in serial-by-bit, serial-by-digit form, to said slave station, and which includes at the slave station, means responsive to receipt of the correct station address and a function address for transmitting a message including said correct station address and said function address to said master station during said third and fourth timing gate pulses, respectively, and followed by a function indication during at least a fifth one of said timing gate pulses, said message being in serial-by-bit, serial-by-digit form; and which also includes at the master station means for translating such received messages into parallel-by-bit, serial-by-bit form, the improvement comprising: a comparison circuit for comparing the encoded address gate pulses and the translated received address during said third timing gate pulse and for comparing the encoded function gate pulses and the translated received function address during said fourth timing gate pulse, said comparison circuit being operable to produce a "correct" voltage gate pulse when the compared quantities agree and to produce an "error" voltage gate pulse when they disagree, an error memory including an error counter operable in any but its zero condition to provide an inhibit gate pulse to said data counter, means for supplying said "error" gate pulse to said error counter to advance it by one count each time an "error" gate pulse appears, an error bypass circuit responsive to said error counter reaching a predetermined count to provide a bypass voltage gate pulse, means supplying said bypass gate pulse to said error counter to reset it at the beginning of each said first timing gate pulses, means responsive to said "correct" gate pulse to reset said error counter, and means supplying said "correct" gate pulse to said error count bypass circuit to terminate said bypass gate pulse when a "correct" gate pulse is developed.

4. In a digital telemetering system for transmitting information between a master and a slave station, which includes, in the master station, means for sequentially encoding a plurality of different addresses, means for transmitting each address to said slave station, and which includes, at the slave station, means responsive to receipt of the address for transmitting a message to the master station including said address, the improvement comprising means for comparing the address received from the slave station with the address encoded at the master station, means responsive to disagreement therebetween for producing a responsive indication of such disagreement, means controlled by said response for causing retransmission of said address from the master station, and means for inhibiting retransmission of said address after a predetermined number of such retransmissions have occurred.

5. In a digital telemetering system for transmitting information between a master and at least one slave station, which includes at the master station, means for sequentially encoding a plurality of different addresses, means for transmitting each address to said slave station, there being sufficient time between such address transmissions for the slave station, to respond with the transmitted address at the slave station, and which includes at said slave station means responsive to receipt of the address for transmitting a message including said address to the master station, the improvement comprising: means for comparing the address received from the slave station with the address encoded at the master station, means responsive to disagreement therebetween for producing a response indicative of such disagreement, and means operable by such response to interrupt such sequential encoding and cause retransmission of the last encoded address from the master station, said last means including a counter operable to count such disagreements and to prevent interruption of sequential coding and retransmission of encoded addresses when the count reaches a predetermined number.

References Cited by the Examiner

UNITED STATES PATENTS

| | | | |
|---|---|---|---|
| 2,242,196 | 5/1941 | Thompson et al. | 178—69 |
| 2,276,646 | 3/1942 | Boswau | 340—163 |
| 2,670,463 | 2/1954 | Raymond et al. | 340—146.1 |
| 2,735,889 | 2/1956 | Canfora | 178—23 |
| 2,740,106 | 3/1956 | Phelps | 340—146.1 |

ROBERT C. BAILEY, *Primary Examiner.*

NEIL C. READ, MALCOLM A. MORRISON, *Examiners.*